United States Patent
Houghtaling et al.

(10) Patent No.: US 8,609,775 B2
(45) Date of Patent: *Dec. 17, 2013

(54) ELECTRODE WITH REDUCED MUD CRACKING VIA MIXED EQUIVALENT WEIGHT IONOMERS

(75) Inventors: Bradley M. Houghtaling, Rochester, NY (US); Thomas A. Greszler, Fairport, NY (US); Timothy J. Fuller, Pittsford, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 111 days.

This patent is subject to a terminal disclaimer.

(21) Appl. No.: 13/311,800

(22) Filed: Dec. 6, 2011

(65) Prior Publication Data

US 2013/0142946 A1 Jun. 6, 2013

(51) Int. Cl.
*C08F 214/14* (2006.01)
*C08F 214/26* (2006.01)

(52) U.S. Cl.
USPC ...................................... 525/200

(58) Field of Classification Search
USPC .......................................................... 525/200
See application file for complete search history.

(56) References Cited

U.S. PATENT DOCUMENTS

| 5,718,947 | A | * | 2/1998 | Martin et al. ............... 427/243 |
| 7,888,433 | B2 | | 2/2011 | Fuller et al. |
| 7,897,691 | B2 | | 3/2011 | MacKinnon et al. |
| 7,897,692 | B2 | | 3/2011 | MacKinnon et al. |
| 7,897,693 | B2 | | 3/2011 | MacKinnon et al. |
| 7,985,805 | B2 | * | 7/2011 | Fuller et al. ............... 525/326.2 |
| 8,053,530 | B2 | | 11/2011 | Fuller et al. |
| 2007/0099054 | A1 | | 5/2007 | Fuller et al. |

* cited by examiner

*Primary Examiner* — Nathan M Nutter
(74) *Attorney, Agent, or Firm* — Brooks Kushman P.C.

(57) ABSTRACT

An ink composition for forming a fuel cell electrode, and in particular, a fuel cell cathode layer is provided. The ink composition includes a first protogenic group-containing ionomer having an equivalent weight less than 800, an optional second protogenic group-containing ionomer having an equivalent weight greater than 800, and a catalyst composition. Electrode layers formed from the ink composition are also provided.

18 Claims, 11 Drawing Sheets

ELECTRODE WITH REDUCED MUD CRACKING VIA MIXED EQUIVALENT WEIGHT IONOMERS

FIELD OF THE INVENTION

In at least one aspect, the present invention relates to catalyst layers for fuel cells, and in particular, to catalyst layers exhibiting reduced mud cracking.

BACKGROUND

Fuel cells are used as an electrical power source in many applications. In particular, fuel cells are proposed for use in automobiles to replace internal combustion engines. A commonly used fuel cell design uses a solid polymer electrolyte ("SPE") membrane or proton exchange membrane ("PEM") to provide ion transport between the anode and cathode.

In proton exchange membrane type fuel cells, hydrogen is supplied to the anode as fuel and oxygen is supplied to the cathode as the oxidant. The oxygen can either be in pure form ($O_2$) or air (a mixture of $O_2$ and $N_2$). PEM fuel cells typically have a membrane electrode assembly ("MEA") in which a solid polymer membrane has an anode catalyst on one face, and a cathode catalyst on the opposite face. The anode and cathode layers of a typical PEM fuel cell are formed of porous conductive materials, such as woven graphite, graphitized sheets, or carbon paper to enable the fuel and oxidant to disperse over the surface of the membrane facing the fuel- and oxidant-supply electrodes, respectively. Each electrode has finely divided catalyst particles (for example, platinum particles) supported on carbon particles to promote oxidation of hydrogen at the anode and reduction of oxygen at the cathode. Protons flow from the anode through the ionically conductive polymer membrane to the cathode where they combine with oxygen to form water which is discharged from the cell. The MEA is sandwiched between a pair of porous gas diffusion layers ("GDL") which, in turn, are sandwiched between a pair of non-porous, electrically conductive elements or plates. The plates function as current collectors for the anode and the cathode, and contain appropriate channels and openings formed therein for distributing the fuel cell's gaseous reactants over the surface of respective anode and cathode catalysts. In order to produce electricity efficiently, the polymer electrolyte membrane of a PEM fuel cell must be thin, chemically stable, proton transmissive, non-electrically conductive and gas impermeable. In typical applications, fuel cells are provided in arrays of many individual fuel cell stacks in order to provide high levels of electrical power.

One method of forming an MEA involves depositing an electrode ink on the PEM by direct spraying or coating in a shim frame. The electrode can be formed on a decal and transferred to the PEM. Alternatively, the catalyst/ionomer ink can be coated on a gas diffusion medium (GDM) substrate, which is known as a catalyst coated diffusion media (CCDM).

Electrode inks typically include a powder catalyst on a support, such as a carbon support, and an ionomer solution which is dispersed in a mixed solvent. The mixed solvent usually contains one or more organic solvents, such as alcohols, and water in a specific ratio that depends on the type of catalyst. The mixture is then homogenized by ball-milling for up to about 3 days before coating on the PEM, decal substrate, or GDM. For shim coating, the catalyst loading can be controlled by the thickness of the shim; for the Mayer wire-wound rod coating, the catalyst loading can be controlled by the wire number. Multiple coatings can be applied for higher catalyst loading, as needed. After applying the wet ink, the solvents are dried in an oven to drive off the solvent and form the electrode. After the catalyst/ionomer coated decal dries, the catalyst/ionomer is then transferred onto a PEM by hot press to form an MEA. The anode and cathode can be hot-pressed onto a PEM simultaneously. The pressure and time for the hot press may vary for different types of MEAs.

Catalyst layers formed from ink composition are prone to forming a network of cracks on the surface, which is called "mud cracking." Mud cracking is known to degrade fuel cell performance, particularly with respect to humidity changes and cell cycling. In particular, mud cracking leads to pinhole formation in the membrane. Pinhole formation causes membrane degradation and thus reduced MEA life.

Several methods for reducing mud cracking are known in the prior art. For example, mud cracking may be reduced by increasing the time allowed for the catalyst ink to dry. Although this technique works reasonably well, increasing the drying time increases manufacturing costs.

Accordingly, there is a need for a new method of reducing mud cracking in catalyst layers in fuel cells.

SUMMARY OF THE INVENTION

The present invention solves one or more problems of the prior art by providing an ink composition for forming fuel cell electrodes. The ink composition includes a first protogenic group-containing ionomer having an equivalent weight less than 800, an optional second protogenic group-containing ionomer having an equivalent weight greater than 800, and a catalyst composition. Advantageously, the ink compositions of the present embodiment are found to form catalyst layers, and in particular, cathode layer with reduced mud cracking.

In another embodiment, a method of forming a fuel cell electrode layer and in particular, a fuel cell cathode layer using the ink compositions is provided. The method includes a step of applying an ink composition layer to a gas diffusion layer to form a coated gas diffusion layer. Characteristically, the ink composition includes a first protogenic group-containing ionomer having an equivalent weight less than 800, an optional second protogenic group-containing ionomer having an equivalent weight greater than 800, and a catalyst composition. The coated gas diffusion layer is then dried to form a fuel cell cathode layer disposed on the gas diffusion layer.

In another embodiment, a fuel cell incorporating the catalyst layer set forth above is provided. The fuel cell includes a first gas diffusion layer and a cathode layer disposed over and contacting the first gas diffusion layer. Characteristically, the cathode layer includes a first protogenic group-containing ionomer having an equivalent weight less than 800, an optional second protogenic group-containing ionomer having an equivalent weight greater than 800, and a catalyst composition. The fuel cell also includes an anode layer, an ion-conducting layer interposed between the cathode layer and the anode layer, a second gas diffusion layer disposed over the anode layer, a first flow field plate disposed over the first gas diffusion layer, and a second flow field plate disposed over the second gas diffusion layer.

BRIEF DESCRIPTION OF THE DRAWINGS

Exemplary embodiments of the present invention will become more fully understood from the detailed description and the accompanying drawings, wherein.

DESCRIPTION OF THE INVENTION

Figure 1:
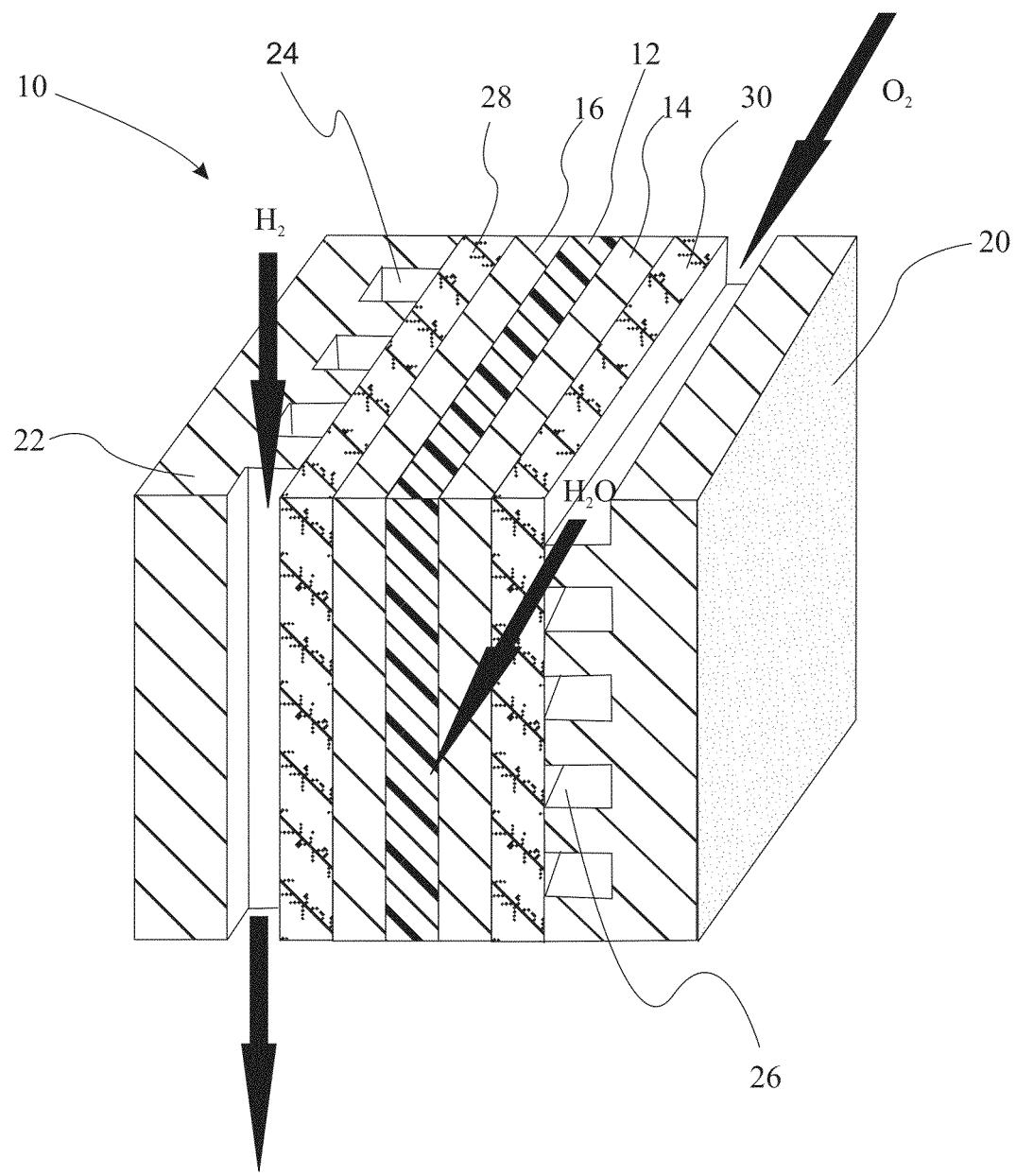
FIG. 1 is a schematic illustration of a fuel cell that incorporates catalyst layers of one or more embodiments of the invention.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "equivalent weight" (EW) as used herein refers to the weight of the polymer in acid form (sulfonic acid groups) required to neutralize one equivalent of NaOH. A higher equivalent weight ionomer has fewer acid groups than in a low equivalent weight ionomer. In general, low equivalent weight ionomers have higher conductivity.

With reference to FIG. 1, a fuel cell that incorporates at least one catalyst layer of one or more embodiments of the invention is provided. PEM fuel cell 10 includes polymeric ion conductive membrane 12 disposed between cathode catalyst layer 14 and anode catalyst layer 16. In a refinement, at least one of cathode catalyst layer 14 and anode catalyst layer 16 include the combination of high equivalent weight ionomer and low equivalent weight ionomer set forth below or 100% of a low equivalent weight ionomer. In particular, cathode catalyst layer 14 includes the combination of high equivalent weight ionomer and low equivalent weight ionomer, or 100% of a low equivalent weight ionomer as set forth below such that the incidence of mud cracking is reduced. In another refinement, one or both of catalyst layer 14 and anode catalyst layer 16 contacts and is adhered to a gas diffusion layer. Fuel cell 10 also includes flow field plates 20, 22, gas channels 24 and 26, and gas diffusion layers 28 and 30.

In an embodiment of the present invention, an ink composition for forming fuel cell electrodes (i.e., catalyst layers) is provided. The ink composition includes a first protogenic group-containing ionomer having an equivalent weight less than 800, an optional second protogenic group-containing ionomer having an equivalent weight greater than 800, and a catalyst composition. The ink composition also typically includes a solvent. Useful solvents include, but are not limited to, water, alcohols, (e.g., ethanol, propanol etc), combinations of water and alcohols, and the like.

Examples of protogenic groups that are present in the first protogenic group-containing ionomer and the second protogenic group-containing ionomer include, but are not limited to —SO$_2$X, —PO$_3$H$_2$, and —COX where X is an —OH, a halogen, an ester, or

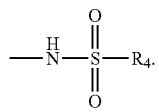

In particular, the first protogenic group-containing ionomer and the second protogenic group-containing ionomer each independently include a sulfonic acid group (—SO3H).

In a variation, the first protogenic group-containing ionomer is present in an amount from about 5% to about 95% of the combined weight of the first protogenic group-containing ionomer and the second protogenic group-containing ionomer, and the second protogenic group-containing ionomer is present in an amount from about 5% to about 95% of the combined weight of the first protogenic group-containing ionomer and the second protogenic group-containing ionomer. The ink composition also includes the solvent (i.e., water, alcohol, or combinations thereof) present in an amount from about 20 weight percent to about 95 weight percent of the total weight of the ink composition. The ink composition also includes the catalyst composition present in an amount from about 1 weight percent to about 7 weight percent of the total weight of the ink composition. In a refinement, the ink composition includes the combination of the first and second protogenic group containing ionomer in an amount from about 3 weight percent to about 79 weight percent to total weight of the ink composition.

In a variation, the solid/solid weight ratio of the first protogenic group-containing ionomer to the second protogenic group-containing ionomer in the ink composition is from 0.05:1 to about 20:1. In a refinement, the solid/solid weight ratio of the first protogenic group-containing ionomer to the second protogenic group-containing ionomer in the ink composition is from 0.5:1 to about 5:1. In another refinement, the ratio of the first protogenic group-containing ionomer to the second protogenic group-containing ionomer in the ink composition is from 0.6:1 to about 4:1. In another refinement, the ratio of the first protogenic group-containing ionomer to the second protogenic group-containing ionomer in the ink composition is from 0.8:1 to about 1.5:1.

In another embodiment, a method of forming a fuel cell electrode layer, and in particular, a fuel cell cathode layer, using the ink compositions is provided. The method includes a step of applying an ink composition layer to a gas diffusion layer to form a coated gas diffusion layer. Characteristically, the ink composition includes a first protogenic group-containing ionomer having an equivalent weight less than 800, an optional second protogenic group-containing ionomer having an equivalent weight greater than 800, and a catalyst composition. The solvents are then removed from the coated gas diffusion layer (typically by heating) to form a fuel cell cathode layer disposed on the gas diffusion layer.

In another embodiment, a fuel cell incorporating the catalyst layer set forth above is provided. The fuel cell includes a first gas diffusion layer and a cathode layer disposed over and contacting the first gas diffusion layer. Characteristically, the cathode layer includes a first protogenic group-containing ionomer having an equivalent weight less than 800, an optional second protogenic group-containing ionomer having an equivalent weight greater than 800, and a catalyst composition. The fuel cell also includes an anode layer, an ion-conducting layer interposed between the cathode layer and the anode layer, a second gas diffusion layer disposed over the anode layer, a first flow field plate disposed over the first gas diffusion layer, and a second flow field plate disposed over the second gas diffusion layer.

The ink composition as set forth above includes a catalyst composition. Typically, the catalyst composition includes support particles which support a catalyst. Typically, the catalyst is disposed on the support particles. The support particles can be formed from any material having sufficiently high surface area to be used in a fuel cell. In a variation, the support particles are electrically conductive or semiconducting particles. Examples of suitable conductive support particles include, but are not limited to, carbon black, graphite, and activated carbon. Examples of suitable low or semiconducting support particles include, but are not limited to, niobium oxide, titanium oxide, and combinations thereof (e.g. niobium doped titanium oxide). In a refinement, the catalyst is a finely divided precious metal having catalytic activity. Suitable precious metals include, but are not limited to, platinum group metal, such as platinum, palladium, iridium, rhodium, ruthenium, and their alloys. In a variation, the platinum group metal is alloyed with other metals as well, if desired. Catalyst coated support materials are commercially available, as is known to those of skill in the art. In a refinement, the catalysts have a size in the range from 1 to 1000 nm, in particular 5 to 200 nm, and preferably 10 to 100 nm.

In another embodiment, a catalyst layer, and in particular, a cathode layer, formed from the ink compositions and by the methods set forth above is provided. The electrode layer includes a first protogenic group-containing ionomer having an equivalent weight less than 800, an optional second protogenic group-containing ionomer having an equivalent weight greater than 800, and a catalyst composition. In a refinement, the catalyst layers have a thickness in the range from 1 to 1000 microns, in particular, from 5 to 500 microns, preferably from 10 to 300 microns. In another refinement, the catalyst content (i.e., platinum loading) of the catalyst layer is from 0.1 to 10.0 mg/cm$^2$, preferably from 0.1 to 6.0 mg/cm$^2$ and particularly preferably from 0.1 to 3.0 mg/cm$^2$. In another refinement, the catalyst loading is about 0.2 mg/cm$^2$. This catalyst loading is typically determined by elemental analysis of a sheet-like sample with X-ray fluorescence spectroscopy (XRF).

The catalyst layer is usually not self-supporting but rather is usually applied to the gas diffusion layer and/or the membrane. In this case, part of the catalyst layer may, for example, diffuse into the gas diffusion layer and/or the membrane as a result of which transition layers are formed. This may also lead to the catalyst layer being perceived as part of the gas diffusion layer.

In a variation, the ratio of the first protogenic group-containing ionomer to the second protogenic group-containing ionomer in the catalyst layer is from 0.05:1 to about 20:1. In a refinement, the ratio of the first protogenic group-containing ionomer to the second protogenic group-containing ionomer in the catalyst layer is from 0.5:1 to about 5:1. In another refinement, the ratio of the first protogenic group-containing ionomer to the second protogenic group-containing ionomer in the catalyst layer is from 0.6:1 to about 4:1. In another refinement, the ratio of the first protogenic group-containing ionomer to the second protogenic group-containing ionomer in the catalyst layer is from 0.8:1 to about 1.5:1. It should be appreciated that these amounts of the first and second protogenic group-containing ionomer refer to the amounts in the ink composition and in the coated catalyst layer (e.g., cathode).

In a variation, the first protogenic group-containing ionomer and the second protogenic group-containing ionomer are each independently a perfluorosulfonic acid (PFSA) polymer. Examples of useful PFSA polymers include a copolymer containing a polymerization unit based on a perfluorovinyl compound represented by:

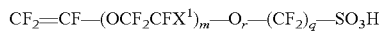

$CF_2=CF-(OCF_2CFX^1)_m-O_r-(CF_2)_q-SO_3H$ where m represents an integer of from 0 to 3, q represents an integer of from 1 to 12, r represents 0 or 1, and $X^1$ represents a fluorine atom or a trifluoromethyl group and a polymerization unit based on tetrafluoroethylene.

In another variation, the first protogenic group-containing ionomer and the second protogenic group-containing ionomer are each independently an ion-conducting polymer having perfluorocyclobutyl (PFCB) moieties. In a particularly useful variation, the first protogenic group-containing ionomer is an ion-conducting polymer having perfluorocyclobutyl (PFCB) moieties. Suitable polymers having cyclobutyl moieties are disclosed in U.S. Pat. Pub. No. 2007/0099054, U.S. Pat. No. 7,897,691 issued Mar. 1, 2011; U.S. Pat. No. 7,897,692 issued Mar. 1, 2011; U.S. Pat. No. 7,888,433 issued Feb. 15, 2011, U.S. Pat. No. 7,897,693 issued Mar. 1, 2011; and U.S. Pat. Pub. No. 2011/0053036, the entire disclosures of which are hereby incorporated by reference. In a variation, the ion-conducting polymer having perfluorocyclobutyl moieties includes a polymer segment comprising polymer segment 1:

$E_0\text{-}P_1\text{-}Q_1\text{-}P_2$      1 wherein:
$E_0$ is a moiety, and in particular, a hydrocarbon-containing moiety, that has a protogenic group such as —$SO_2X$, —$PO_3H_2$, —COX, and the like;
$P_1$, $P_2$ are each independently absent, —O—, —S—, —SO—, —CO—, —$SO_2$—, —NH—, $NR_2$—, or —$R_3$—;
$R_2$ is $C_{1-25}$ alkyl, $C_{1-25}$ aryl or $C_{1-25}$ arylene;
$R_3$ is $C_{1-25}$ alkylene, $C_{1-25}$ perfluoroalkylene, perfluoroalkyl ether, alkylether, or $C_{1-25}$ arylene;
X is an —OH, a halogen, an ester, or

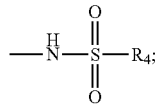

$R_4$ is trifluoromethyl, $C_{1-25}$ alkyl, $C_{1-25}$ perfluoroalkylene, $C_{1-25}$ aryl, or $E_1$ (see below); and
$Q_1$ is a fluorinated cyclobutyl moiety.

In a variation of the present invention, the ion-conducting polymer comprises polymer segments 2 and 3:

$[E_1(Z_1)_d]\text{—}P_1\text{-}Q_1\text{-}P_2$      2

$E_2\text{-}P_3\text{-}Q_2\text{-}P_4$      3 wherein:
$Z_1$ is absent or a protogenic group such as —$SO_2X$, —$PO_3H_2$, —COX, and the like;
$E_1$ is an aromatic containing moiety;
$E_2$ is an unsulfonated aromatic-containing and/or aliphatic-containing moiety;
X is an —OH, a halogen, an ester, or

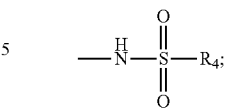

d is the number of $Z_1$ attached to $E_1$;
$P_1$, $P_2$, $P_3$, $P_4$ are each independently absent, —O—, —S—, —SO—, —CO—, —$SO_2$—, —NH—, $NR_2$—, or —$R_3$—;
$R_2$ is $C_{1-25}$ alkyl, $C_{1-25}$ aryl, or $C_{1-25}$ arylene;
$R_3$ is $C_{1-25}$ alkylene, $C_{1-25}$ perfluoroalkylene, perfluoroalkyl ether, alkylether, or $C_{1-25}$ arylene;
$R_4$ is trifluoromethyl, $C_{1-25}$ alkyl, $C_{1-25}$ perfluoroalkylene, $C_{1-25}$ aryl, or another $E_1$ group; and
$Q_1$, $Q_2$ are each independently a fluorinated cyclobutyl moiety.

In one refinement, d is equal to the number of aromatic rings in $E_1$. In another refinement, each aromatic ring in $E_1$ can have 0, 1, 2, 3, or 4 $Z_1$ groups.

In another variation of the present embodiment, the ion-conducting polymer comprises segments 4 and 5:

$E_1\text{—}P_1\text{—}Q_1\text{—}P_2$
$|$
$R_8(Z_1)_d$      4

$E_2\text{—}P_3\text{—}Q_2\text{—}P_4$      5 wherein:
$Z_1$ is absent or a protogenic group such as —$SO_2X$, —$PO_3H_2$, —COX, and the like;
$E_1$, $E_2$ are each independently an aromatic-containing and/or aliphatic-containing moiety;
X is an —OH, a halogen, an ester, or

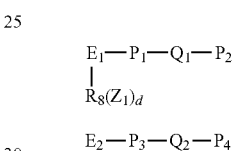

d is the number of $Z_1$ attached to $R_8$;
$P_1$, $P_2$, $P_3$, $P_4$ are each independently absent, —O—, —S—, —SO—, —CO—, —$SO_2$—, —NH—, $NR_2$—, or —$R_3$—;
$R_2$ is $C_{1-25}$ alkyl, $C_{1-25}$ aryl, or $C_{1-25}$ arylene;
$R_3$ is $C_{1-25}$ alkylene, $C_{1-25}$ perfluoroalkylene, perfluoroalkyl ether, alkylether, or $C_{1-25}$ arylene;
$R_4$ is trifluoromethyl, $C_{1-25}$ alkyl, $C_{1-25}$ perfluoroalkylene, $C_{1-25}$ aryl, or another $E_1$ group;
$R_8(Z_1)_d$ is a moiety having d number of protogenic groups; and
$Q_1$, $Q_2$ are each independently a fluorinated cyclobutyl moiety.

In a refinement of this variation, $R_8$ is $C_{1-25}$ alkylene, $C_{1-25}$ perfluoroalkylene, perfluoroalkyl ether, alkylether, or $C_{1-25}$ arylene. In one refinement, d is equal to the number of aromatic rings in $R_8$. In another refinement, each aromatic ring in $R_8$ can have 0, 1, 2, 3, or 4 $Z_1$ groups. In still another refinement, d is an integer from 1 to 4 on average.

In another variation of the present embodiment, the ion-conducting polymer having perfluorocyclobutyl moieties comprises polymer segments 6 and 7:

$E_1(SO_2X)_d\text{—}P_1\text{-}Q_1\text{-}P_2$      6

$E_2\text{-}P_3\text{-}Q_2\text{-}P_4$      7 connected by a linking group $L_1$ to form polymer units 8 and 9:

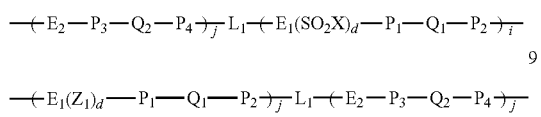

wherein:

$Z_1$ is absent or a protogenic group such as $—SO_2X$, $—PO_3H_2$, $—COX$, and the like;

$E_1$ is an aromatic-containing moiety;

$E_2$ is an unsulfonated aromatic-containing and/or aliphatic-containing moiety;

$L_1$ is a linking group;

X is an $—OH$, a halogen, an ester, or

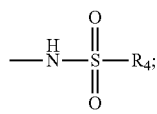

d is a number of $Z_1$ functional groups attached to $E_1$;

$P_1, P_2, P_3, P_4$ are each independently absent, $—O—$, $—S—$, $—SO_2—$, $—CO—$, $—NH—$, $NR_2—$, $—R_3—$, and $R_2$ is $C_{1-25}$ alkyl, $C_{1-25}$ aryl, or $C_{1-25}$ arylene;

$R_3$ is $C_{1-25}$ alkylene, $C_{1-25}$ perfluoroalkylene, or $C_{1-25}$ arylene;

$R_4$ is trifluoromethyl, $C_{1-25}$ alkyl, $C_{1-25}$ perfluoroalkylene, $C_{1-25}$ aryl, or another $E_1$ group;

$Q_1, Q_2$ are each independently a fluorinated cyclobutyl moiety;

i is a number representing the repetition of polymer segment 6 with i typically being from 1 to 200; and j is a number representing the repetition of a polymer segment 7 with j typically being from 1 to 200. In one refinement, d is equal to the number of aromatic rings in $E_1$. In another refinement, each aromatic ring in $E_1$ can have 0, 1, 2, 3, or 4 $Z_1$ groups.

In still another variation of the present embodiment, the ion-conducting polymer having perfluorocyclobutyl moieties includes polymer segments 10 and 11:

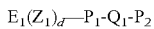     10

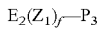     11 wherein:

$Z_1$ is absent or a protogenic group such as $—SO_2X$, $—PO_3H_2$, $—COX$, and the like;

$E_1, E_2$ are each independently an aromatic or aliphatic-containing moiety wherein at least one of $E_1$ and $E_2$ includes an aromatic containing moiety substituted with $Z_1$;

X is an $—OH$, a halogen, an ester, or

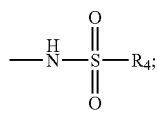

d is the number of $Z_1$ functional groups attached to $E_1$;

f is the number of $Z_1$ functional groups attached to $E_2$;

$P_1, P_2, P_3$ are each independently absent, $—O—$, $—S—$, $—SO—$, $—SO_2—$, $—CO—$, $—NH—$, $NR_2—$, or $—R_3—$;

$R_2$ is $C_{1-25}$ alkyl, $C_{1-25}$ aryl, or $C_{1-25}$ arylene;

$R_3$ is $C_{1-25}$ alkylene, $C_{1-25}$ perfluoroalkylene, perfluoroalkyl ether, alkyl ether, or $C_{1-25}$ arylene;

$R_4$ is trifluoromethyl, $C_{1-25}$ alkyl, $C_{1-25}$ perfluoroalkylene, $C_{1-25}$ aryl, or another $E_1$ group; and $Q_1$ is a fluorinated cyclobutyl moiety, with the proviso that when d is greater than zero, f is zero and when f is greater than zero, d is zero. In one refinement, d is equal to the number of aromatic rings in $E_1$. In another refinement, each aromatic ring in $E_1$ can have 0, 1, 2, 3, or 4 $Z_1$ groups. In still another refinement, d is an integer from 1 to 4 on average. In one refinement, f is equal to the number of aromatic rings in $E_2$. In another refinement, each aromatic ring in $E_2$ can have 0, 1, 2, 3, or 4 $Z_1$ groups. In still another refinement, f is an integer from 1 to 4 on average. In a variation, polymer segments 10 and 11 are each independently repeated 1 to 10,000 times to form respective polymer blocks that may be joined with a linking group $L_1$ shown below.

In another variation of the present embodiment, the ion-conducting polymer comprises:

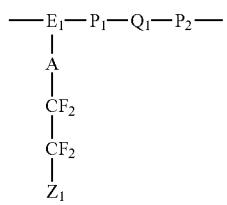     12 wherein:

$Z_1$ is hydrogen or a protogenic group such as $—SO_2X$, $—PO_3H_2$, $—COX$, and the like;

$E_1$ is an aromatic containing moiety;

A is absent or oxygen (O) or a chain extender having a carbon backbone;

X is an $—OH$, a halogen, an ester, or

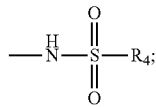

$P_1, P_2$ are each independently absent, $—O—$, $—S—$, $—SO—$, $—SO_2—$, $—CO—$, $—NH—$, $NR_2—$, or $—R_3—$, and $R_2$ is $C_{1-25}$ alkyl, C1-25 aryl, or $C_{1-25}$ arylene;

$R_3$ is $C_{1-25}$ alkylene, $C_{1-25}$ perfluoroalkylene, or $C_{1-25}$ arylene;

$R_4$ is trifluoromethyl, $C_{1-25}$ alkyl, $C_{1-25}$ perfluoroalkylene, $C_{1-25}$ aryl, or another $E_1$ group; and $Q_1$ is a fluorinated cyclobutyl moiety.

In a variation of the present embodiment, polymer segment 12 is repeated j times to form a polymer block described by formula 13.

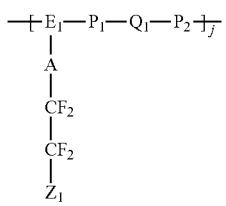

In a refinement, j is from about 1 to 10,000. In another refinement, j is from about 2 to about 100. In another refinement, j is from about 3 to about 50. In still another refinement, j is from about 4 to about 40.

In a variation of the present invention, the polymer having polymer segment 1 includes a second polymer segment having formula 14:

$$E_2\text{-}P_3\text{-}Q_2\text{-}P_4 \qquad 14$$

wherein:

$E_2$ is an aromatic containing moiety;

$P_3$, $P_4$ are each independently absent, —O—, —S—, —SO—, —SO$_2$—, —CO—, —NH—, NR$_2$—, or —R$_3$—, and $R_2$ is $C_{1-25}$ alkyl, C1-25 aryl, or $C_{1-25}$ arylene;

$R_3$ is $C_{1-25}$ alkylene, $C_{1-25}$ perfluoroalkylene, or $C_{1-25}$ arylene;

$R_4$ is trifluoromethyl, $C_{1-25}$ alkyl, $C_{1-25}$ perfluoroalkylene, $C_{1-25}$ aryl, or another $E_2$ group; and $Q_2$ is a fluorinated cyclobutyl moiety.

In a refinement, polymer segment 14 is repeated k times to form polymer block 15:

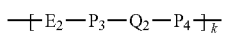

In a refinement, k is from about 1 to about 10,000. In another refinement, k is from about 2 to about 100. In another refinement, k is from about 3 to about 50. In still another refinement, k is from about 4 to about 40.

In another variation, polymer blocks 13 and 15 are connected by a linking group $L_1$:

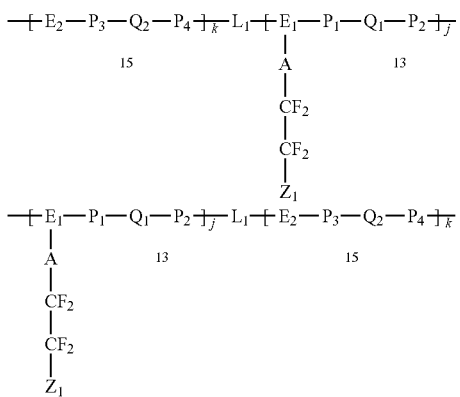

Examples for $Q_1$ and $Q_2$ in the above formulae are:

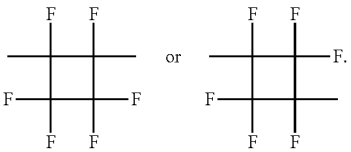

In each of the formulae 1-15, $E_1$ and $E_2$ include one or more aromatic rings. For example, $E_1$ and $E_2$, include one or more of the following moieties:

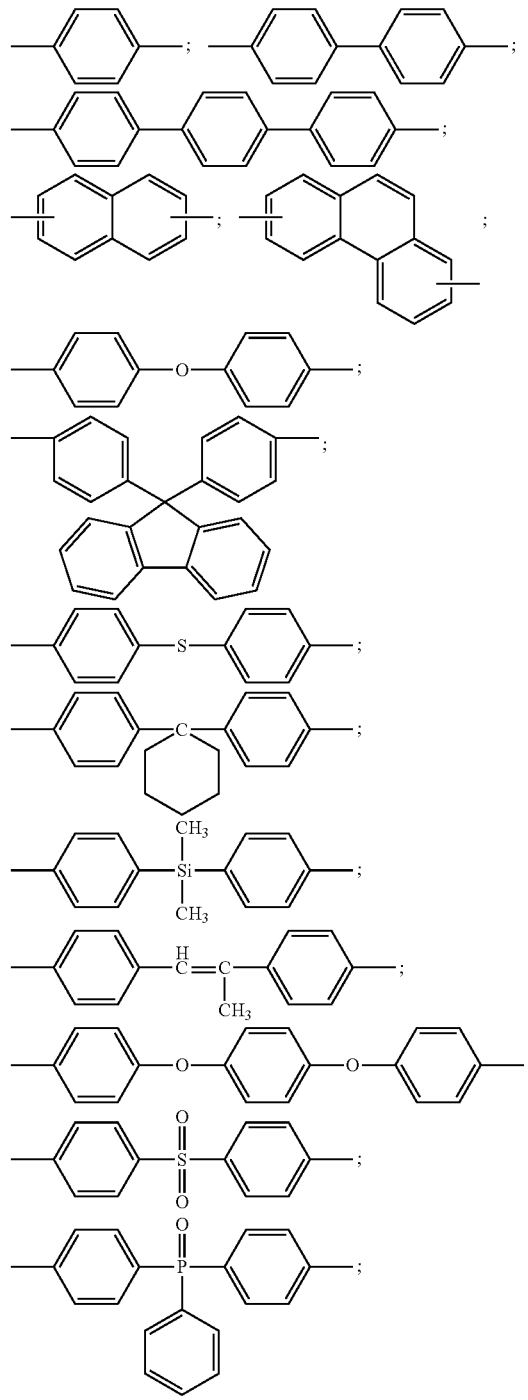

-continued
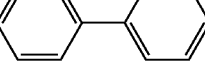; or
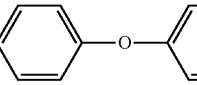.
Examples of L₁ include the following linking groups:
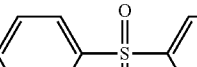, 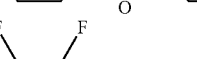,
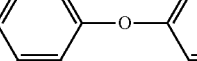,
,
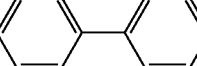,
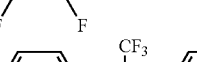,
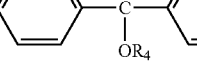,
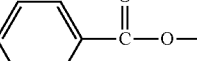,
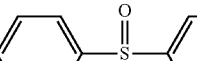,
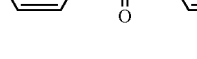,
, or
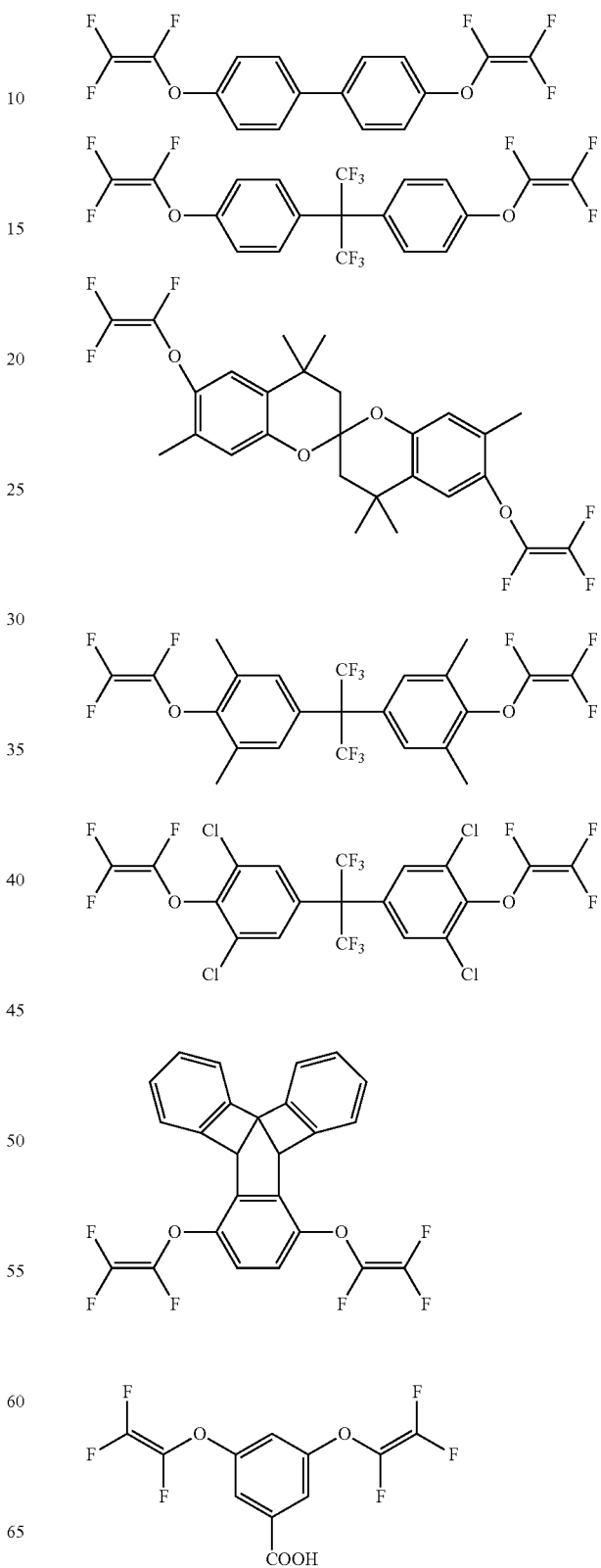,
where $R_5$ is an organic group, such as an alkyl or acyl group.
With regards to new PFCB moiety structures for electrodes, high free volume PFCB ionomers with the following $E_1$ and $E_2$ are relevant as derived from the following PFCB "monomers":

-continued

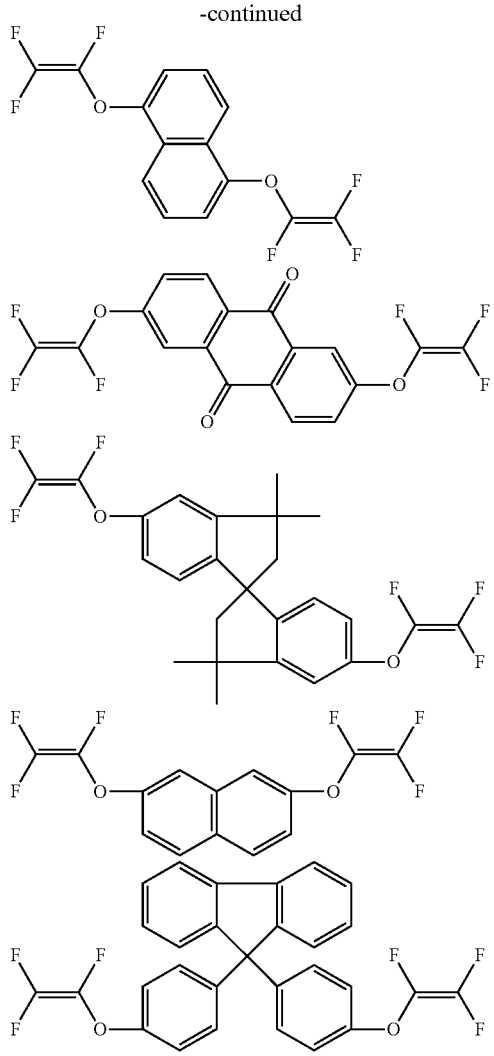

Other relevant $E_1$ and $E_2$ groups imparting high-free volume to the ionomers include the following:

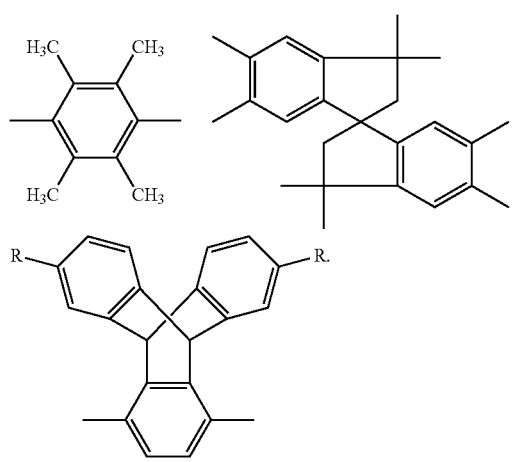

In yet another variation, the first low equivalent weight (high ion exchange capacity) ion conducting polymer has PFCB moieties, as described above) and the second higher equivalent weight sulfonic acid containing ionomer is a perfluorosulfonic acid (PFSA) ionomer (such as Nafion DE2020 (DuPont) with a 900 equivalent weight).

The following examples illustrate the various embodiments of the present invention. Those skilled in the art will recognize many variations that are within the spirit of the present invention and scope of the claims.

INVENTIVE EXAMPLE 1

10:90 Low EW/High EW ((IC)=1.35) IC= Ionomer$_{(s)}$:Carbon$_{(s)}$

About 36.66 g of n-propanol, 9.29 g deionized (DI) water, 1.19 g of the low equivalent weight ionomer (20.5% solids, SS700 Asahi-Kasei) and 10.27 g NAFION™ (21.5% solids, D2020 from DuPont) are added to a clean polyethylene bottle. A magnetic stir bar is then added to the bottle. The bottle is placed on a stir plate and mixed for 30 minutes. The mixture is then added to 2.60 grams of a Pt-alloy catalyst (Tanaka) and 240 g of 5 mm zirconia spherical milling media. The resulting contents are placed on a ball mill and milled for 24 hours. The ink composition is subsequently recovered.

INVENTIVE EXAMPLE 2

25:75 Low EW/High EW (IC=1.27)

About 37.75 g of n-propanol, 8.81 g DI water, 2.79 g of the low equivalent weight ionomer (20.5% solids, SS700 Asahi-Kasei) and 8.05 g Nafion (21.5% solids, D2020 from DuPont) are added to a clean polyethylene bottle. A magnetic stir bar is placed in the bottle. The bottle is placed on a stir plate and mixed for 30 minutes. The mixture is then added to 2.60 grams of a Pt-alloy catalyst and 240 g of 5 mm zirconia spherical milling media. The resulting contents are placed on a ball mill and milled for 24 hours. The ink composition is subsequently recovered.

INVENTIVE EXAMPLE 3

50:50 Low EW/High EW (IC=1.15)

About 39.33 g of n-propanol, 8.16 g DI water, 5.05 g of the low equivalent weight ionomer (20.5% solids, SS700 Asahi-Kasei) and 4.86 g Nafion (21.5% solids, D2020 from DuPont) are added to a clean polyethylene bottle. A magnetic stir bar is added to the bottle. The bottle is then placed on a stir plate and mixed for 30 minutes. The mixture is then added to 2.60 grams of a Pt-alloy catalyst and 240 g of 5 mm zirconia spherical milling media. The contents are placed on a ball mill and milled for 24 hours. The ink composition is subsequently recovered.

INVENTIVE EXAMPLE 4

75:25 Low EW/High EW (IC=1.02)

About 40.71 g of n-propanol, 7.81 g DI water, 6.72 g of the low equivalent weight ionomer (20.5% solids, SS700 Asahi-Kasei) and 2.15 g Nafion (21.5% solids, D2020 from DuPont) are added to a clean polyethylene bottle. A magnetic stir bar is added to the bottle. The mixture is placed on a stir plate and mixed for 30 minutes. The mixture is added to 2.60 grams of a Pt-alloy catalyst and 240 g of 5 mm zirconia spherical milling media. The contents are placed on a ball mill and milled for 24 hrs. The ink composition is subsequently recovered.

INVENTIVE EXAMPLE 5

100% Low Equivalent Weight Ionomer Control (IC=0.9)

About 41.83 g of n-propanol, 7.66 g DI water, 7.90 g of the low equivalent weight ionomer (20.5% solids, SS700 Asahi-Kasei) are added to a clean polyethylene bottle. A magnetic stir bar is added to the bottle. The bottle is placed on a stir plate and mixed for 30 minutes. The mixture is added to 2.60 grams of a Pt-alloy catalyst and 240 grams of 5 mm zirconia spherical milling media. The contents are placed on a ball mill and milled for 24 hours. The ink composition is subsequently recovered.

INVENTIVE EXAMPLE 6

5:95 (w/w) PFCB/High EW (IC=1.40)

About 36.1 g n-propanol, 11.1 g DI water and 9.1 g of a 900 EW ionomer (28 wt % ionomer) are added to a clean polyethylene bottle. A magnetic stir bar is added to the bottle. The bottle is placed on a stir plate and mixed for 2 minutes. About 1.3 grams of a 10 wt % solution of PFCB (reference: Tetramer Technologies, Pendleton, S.C., TAKS104-1.8LSC, 700 equivalent weight) in n-propanol is added to the mixture and stirred for 30 minutes. The mixture is added to 2.60 grams of a Pt-alloy catalyst and 240 g of 5 mm zirconia spherical milling media. The contents are placed on a ball mill and milled for 24 hours. The ink composition is subsequently recovered.

INVENTIVE EXAMPLE 7

100% PFCB (IC=0.7)

About 30.8 g n-propanol, 14.0 g DI water and 12.6 grams of a 10 wt % solution of PFCB (reference: Tetramer Technologies, Pendleton, S.C., TAKS104-1.8LSC, 700 equivalent weight) in n-propanol are added to a clean polyethylene bottle. A magnetic stir bar is added to the bottle. The bottle is placed on a stir plate and stirred for 30 minutes. The mixture is added to 2.60 grams of a Pt-alloy catalyst and 240 g of 5 mm zirconia spherical milling media. The contents are placed on a ball mill and milled for 24 hours. The ink composition is subsequently recovered.

COMPARATIVE EXAMPLE 1

100% High Equivalent Weight Ionomer Control (IC=1.4)

About 35.89 g of n-propanol, 9.67 g DI water, 11.83 g of Nafion (21.5% solids, D2020 from DuPont) are added to a clean polyethylene bottle. A magnetic stir bar is added to the bottle. The bottle is placed on a stir plate and mixed for 30 minutes. The mixture is added to 2.60 g of a Pt-alloy catalyst and 240 g of 5 mm zirconia spherical milling media. The contents are placed on a ball mill and milled for 24 hours. The ink composition is subsequently recovered.

COMPARATIVE EXAMPLE 2

100% High EW (IC=1.60)

About 36.4 g n-propanol, 10.6 g DI water and 10.4 g of the 900EW ionomer (28 weight % ionomer) to a clean polyethylene bottle are added. A magnetic stir bar is added to the bottle. The bottle is placed on a stir plate and mixed for 30 minutes. The mixture is added to 2.60 grams of a Pt-alloy catalyst and 240 g of 5 mm zirconia spherical milling media. The contents are placed on a ball mill and milled for 24 hours. The ink composition is subsequently recovered.

Cathode Layer Formation

Cathode layers are formed using a Mayer wire-wound rod. The cathode ink is coated onto a piece of gas diffusion media (GDM) to a final platinum (Pt) loading of 0.20 mg Pt/cm$^2$. The wet coating is placed under an IR dryer for 4 minutes at 400° F. (Note—this is the IR source temp setpoint, not the actual film temperature). The final coating is called the cathode catalyst coated diffusion medium (CCDM).

Figure 2:
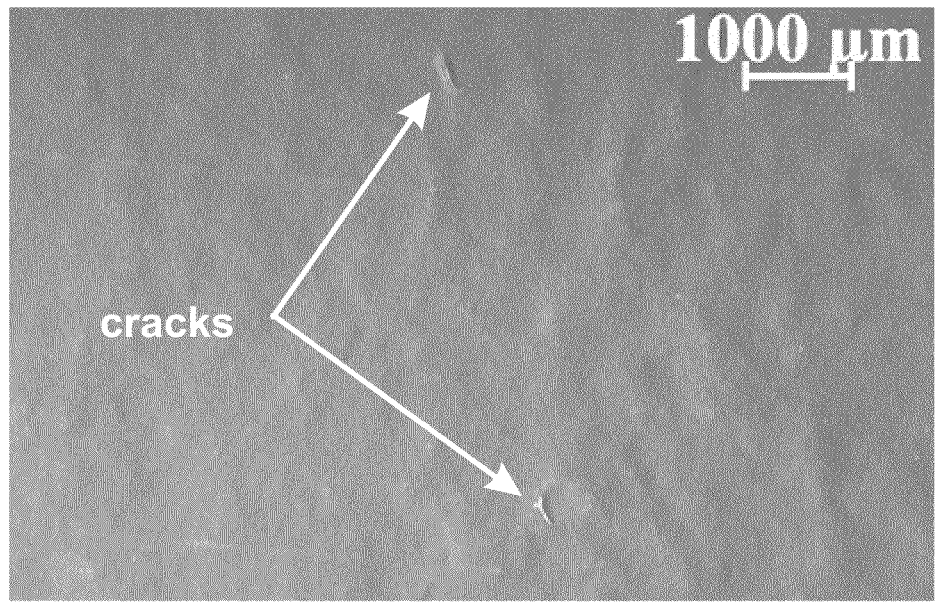
FIG. 2 is an optical surface image of a cathode layer formed from a perfluorosulfonic acid (PFSA) polymer having an equivalent weight of about 700.
Figure 3:
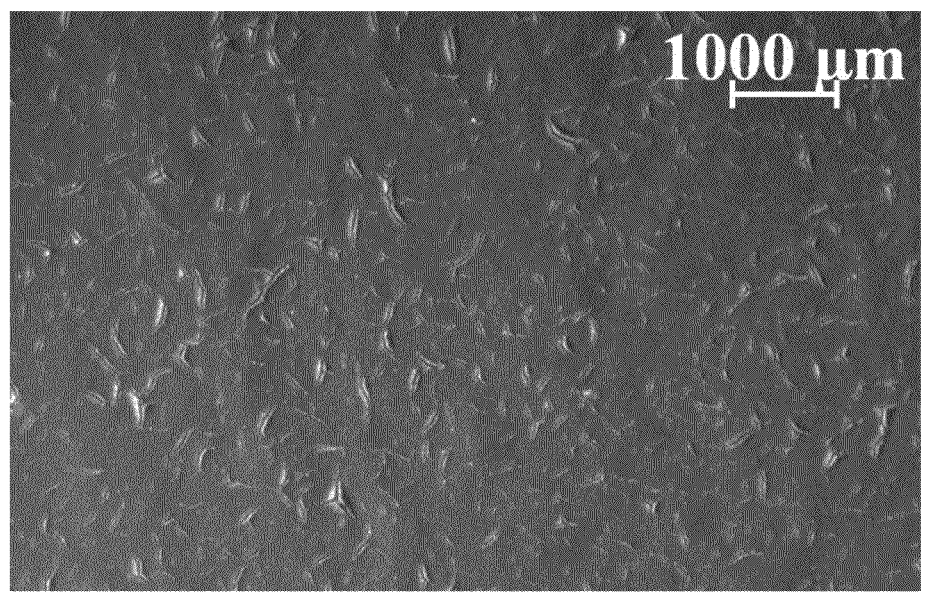
FIG. 3 is an optical surface image of a cathode layer formed from a PFSA polymer having an equivalent weight of about 900.

FIG. 2 is an optical surface image of a cathode layer formed from a PFSA polymer having an equivalent weight (EW) of about 700. FIG. 3 is an optical surface image of a cathode layer formed from a PFSA polymer having an equivalent weight of about 900. This sample exhibits minor cracking. It should be observed that the sample with an equivalent weight of about 700 exhibits only minor cracking while the sample with an equivalent weight of about 900 exhibits severe cracking.

Figure 4:
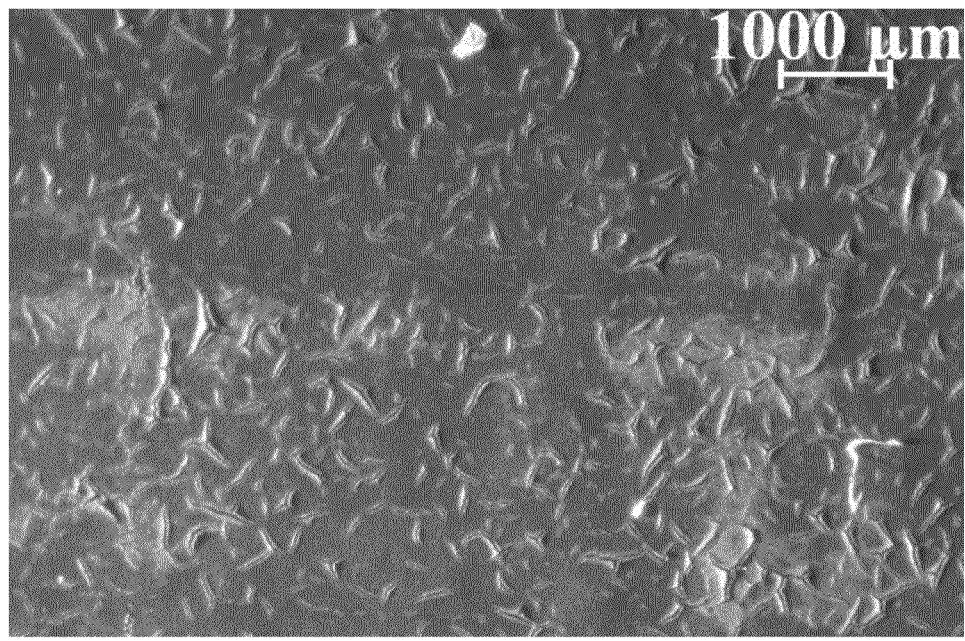
FIG. 4 is an optical surface image of a cathode layer formed from a combination of a PFSA polymer having an equivalent weight of about 700 and a PFSA having an equivalent weight of about 900 in a weight ratio of 10:90 (IC=1.35, where IC=ionomer to carbon weight ratio in the electrode)
Figure 5:
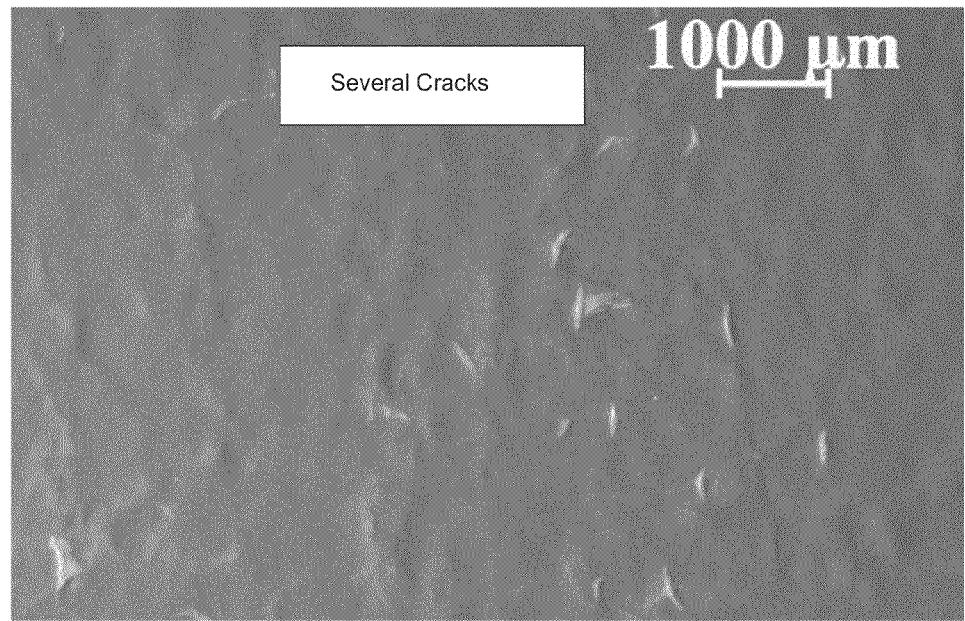
FIG. 5 is an optical surface image of a cathode layer formed from a combination of a PFSA polymer having an equivalent weight of about 700 and a PFSA polymer having an equivalent weight of about 900 in a weight ratio of 25:75 (IC=1.27)
Figure 6:
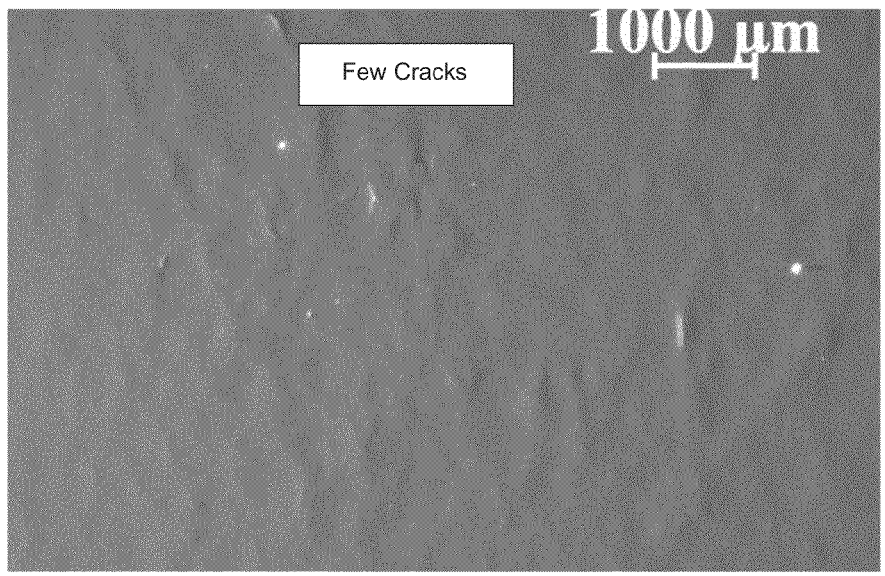
FIG. 6 is an optical surface image of a cathode layer formed from a combination of a PFSA polymer having an equivalent weight of about 700 and a PFSA polymer having an equivalent weight of about 900 in a weight ratio of 50:50 (IC=1.15)
Figure 7:
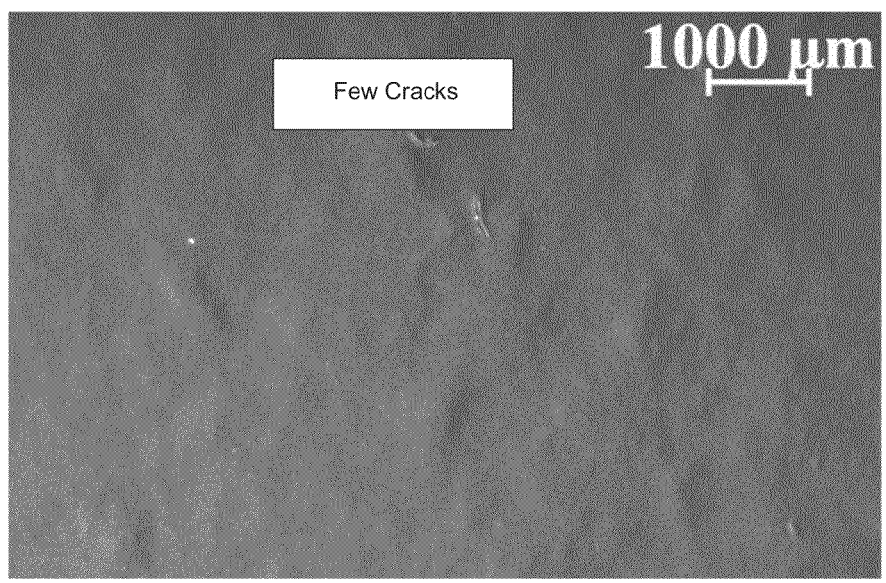
FIG. 7 is an optical surface image of a cathode layer formed from a combination of a PFSA polymer having an equivalent weight of about 700 and a PFSA polymer having an equivalent weight of about 900 in a weight ratio of 75:25 (IC=1.02)

FIGS. 4 through 8 provide optical surface images for cathode layers formed from various combinations of a PFSA polymer having an equivalent weight of about 700 and a PFSA having an equivalent weight of about 900. FIG. 4 is an optical surface image of a cathode layer formed from a combination of a PFSA polymer having an equivalent weight of about 700 and a PFSA having an equivalent weight of about 900 in a weight ratio of 10:90 (700 EW:900 EW). FIG. 5 is an optical surface image of a cathode layer formed from a combination of a PFSA polymer having an equivalent weight of about 700 and a PFSA polymer having an equivalent weight of about 900 in a weight ratio of 25:75. FIG. 6 is an optical surface image of a cathode layer formed from a combination of a PFSA polymer having an equivalent weight of about 700 and a PFSA polymer having an equivalent weight of about 900 in a weight ratio of 50:50. FIG. 7 is an optical surface image of a cathode layer formed from a combination of a PFSA polymer having an equivalent weight of about 700 and a PFSA polymer having an equivalent weight of about 900 in a weight ratio of 75:25. The sample prepared at a ratio of 10:90 exhibits severe cracking. However, the samples prepared at weight ratios of 25:75, 50:50, and 75:25 show only minor cracking.

Figure 8:
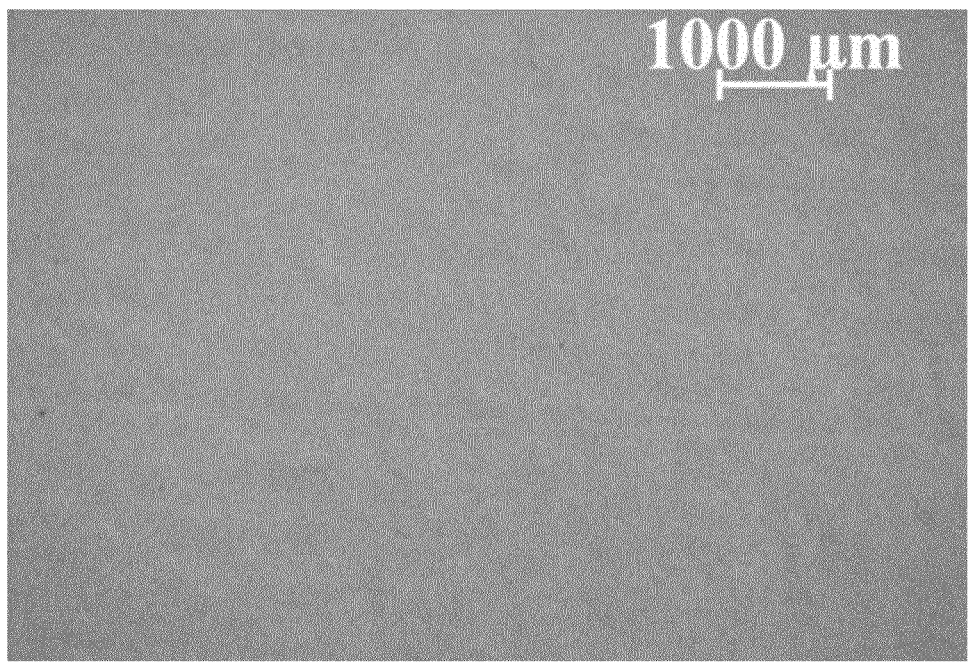
FIG. 8 is an optical surface image of a cathode layer formed from a combination of a PFCB polymer having an equivalent weight of about 700 and a PFSA polymer having an equivalent weight of about 900 in a weight ratio of 5:95.
Figure 9:
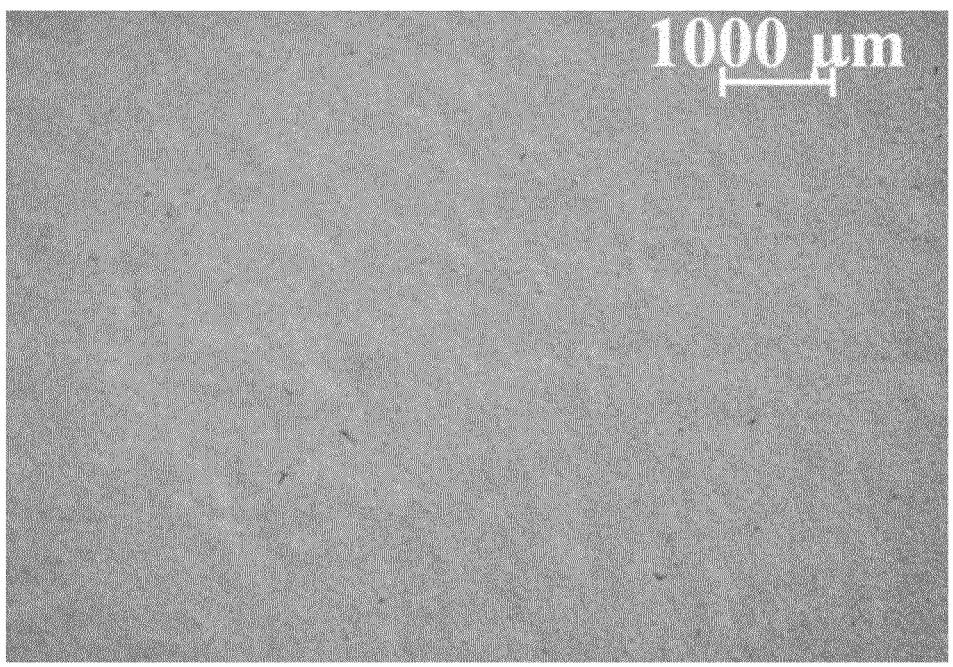
FIG. 9 is an optical surface image of a cathode layer formed from a PFCB polymer with an equivalent weight of 700.
Figure 10:
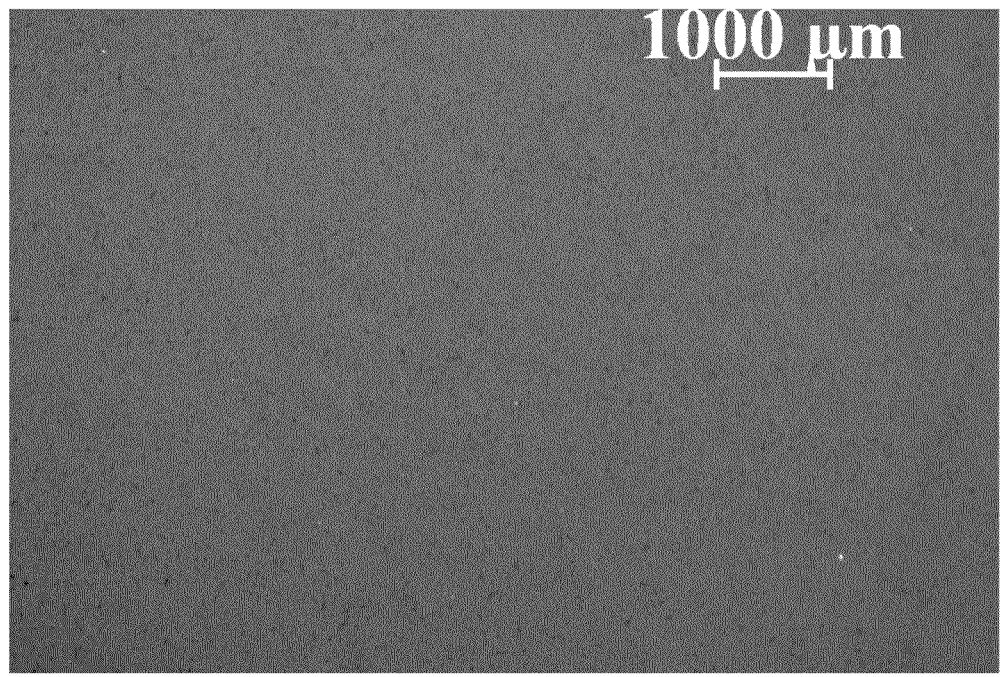
FIG. 10 is an optical surface image of a cathode layer formed from a PFSA polymer having an equivalent weight of about 900.

FIG. 8 is an optical surface image of a cathode layer formed from a combination of a PFCB polymer having an equivalent weight of about 700 and a PFSA polymer having an equivalent weight of about 900 in a weight ratio of 5:95 as set forth in inventive example 6. FIG. 9 is an optical surface image of a cathode layer formed from a PFCB polymer as set forth in inventive example 7. FIG. 10 is an optical surface image of a cathode layer formed from a PFSA polymer having an equivalent weight of about 900 as set forth in comparative example 2. It is evident that the samples containing PFCB exhibit little if any cracking while the sample having only a PFSA with an equivalent weight of about 900 exhibits severe cracking.

Figure 11:
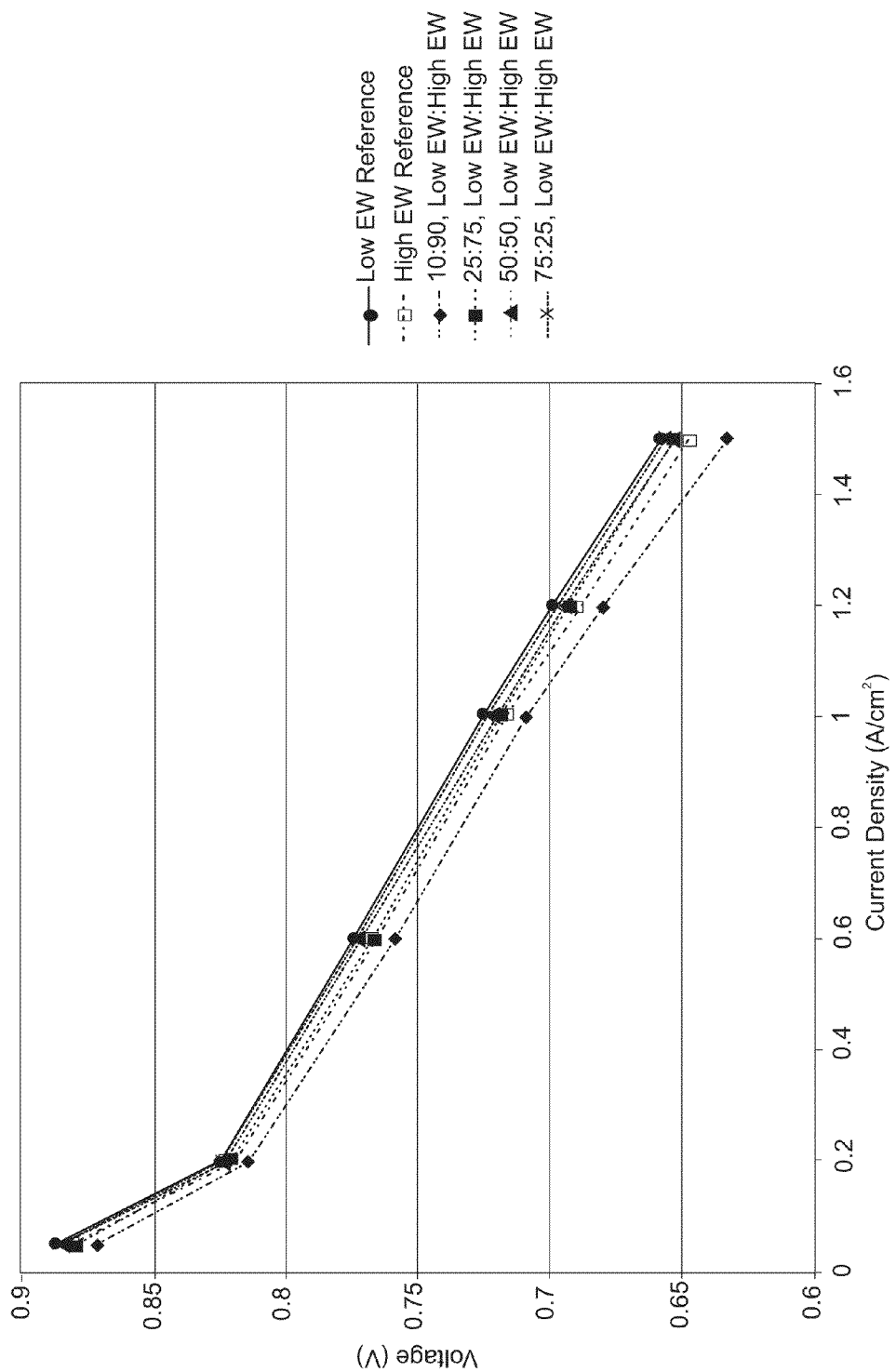
FIG. 11 is a polarization curve at 80° C., 32% relative humidity (RH), and 150 $kPa_{abs}$ for a fuel cell incorporating various cathode layer formed from the inks of embodiments of the invention.
Figure 12:
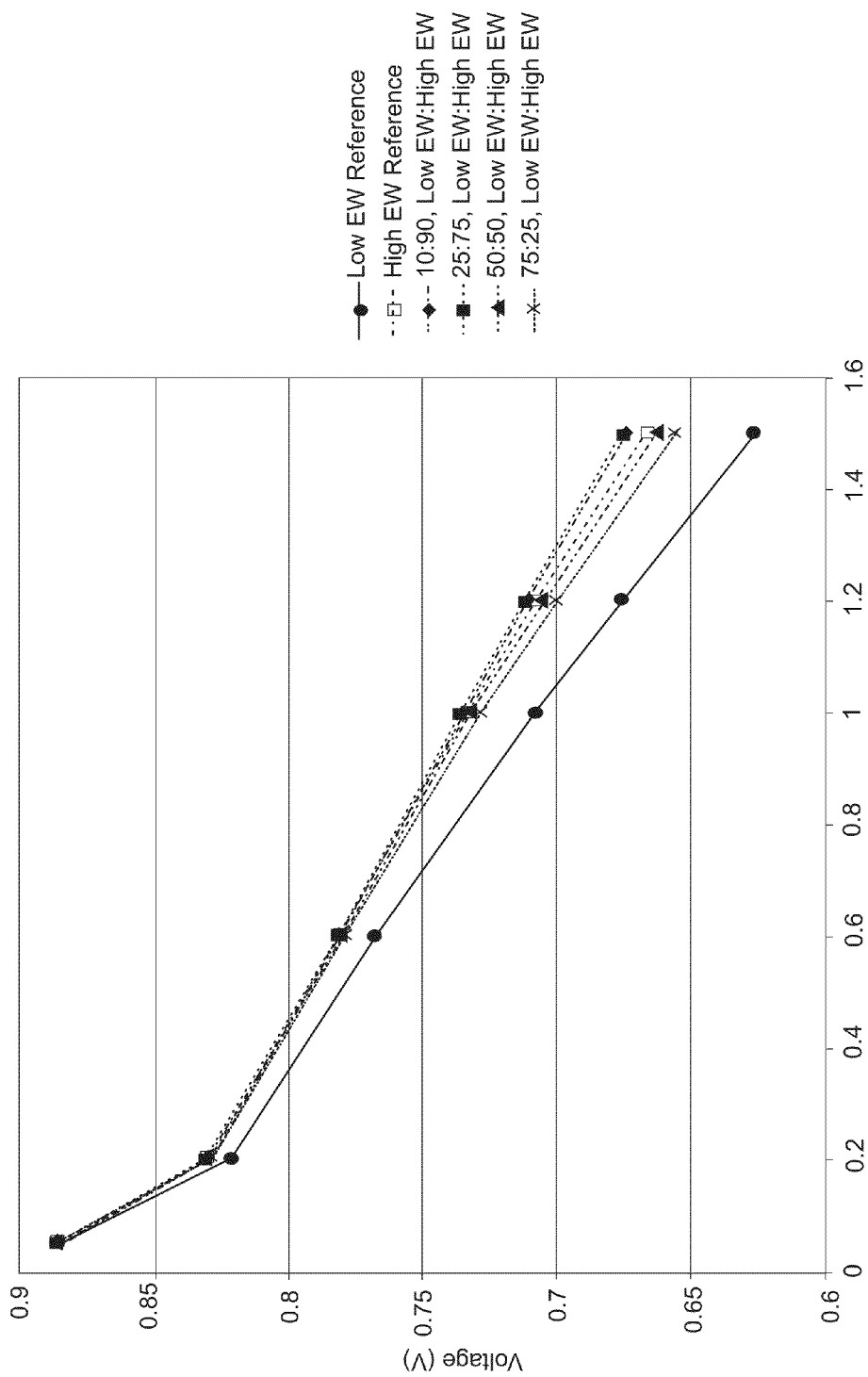
FIG. 12 is a polarization curve at 80° C., 100% relative humidity (RH), and 170 $kPa_{abs}$ for a fuel cell incorporating various cathode layers formed from the inks of embodiments of the invention.
Figure 13:
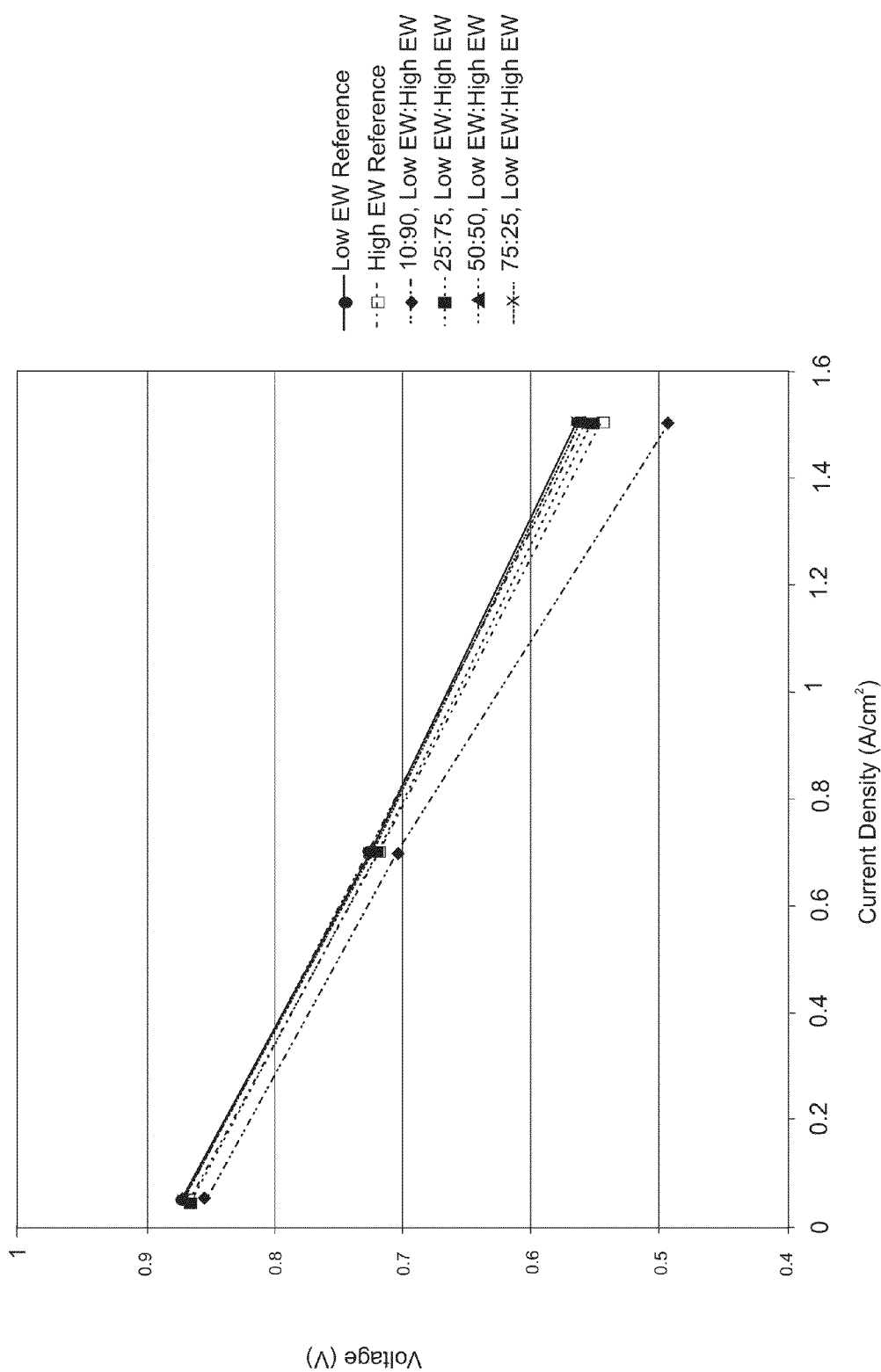
FIG. 13 is a polarization curve at 95° C., 26% relative humidity (RH), and 150 $kPa_{abs}$ for a fuel cell incorporating various cathode layers formed from the inks of embodiments of the invention.

FIGS. 11-13 provide polarization curves comparing the performance for fuel cells having cathode layers made from inventive samples 1-5 and comparative example 1. Reference samples are included in these plots. FIG. 11 is a polarization curve at 80° C., 32% relative humidity (RH), and 150 kPa$_{abs}$ for a fuel cell incorporating various cathode layers formed from the inks of embodiments of the invention. FIG. 12 is a polarization curve at 80° C., 100% relative humidity (RH), and 170 kPa$_{abs}$ for a fuel cell incorporating various cathode layers formed from the inks of embodiments of the invention. FIG. 13 is a polarization curve at 95° C., 26% relative humidity (RH), and 150 kPa$_{abs}$ for a fuel cell incorporating various cathode layers formed from the inks of embodiments of the invention. In general, the performance of each of the samples is roughly equivalent. The performance of a sample with a 10:90 weight ratio shows somewhat diminished performance at high current densities.

Figure 14:
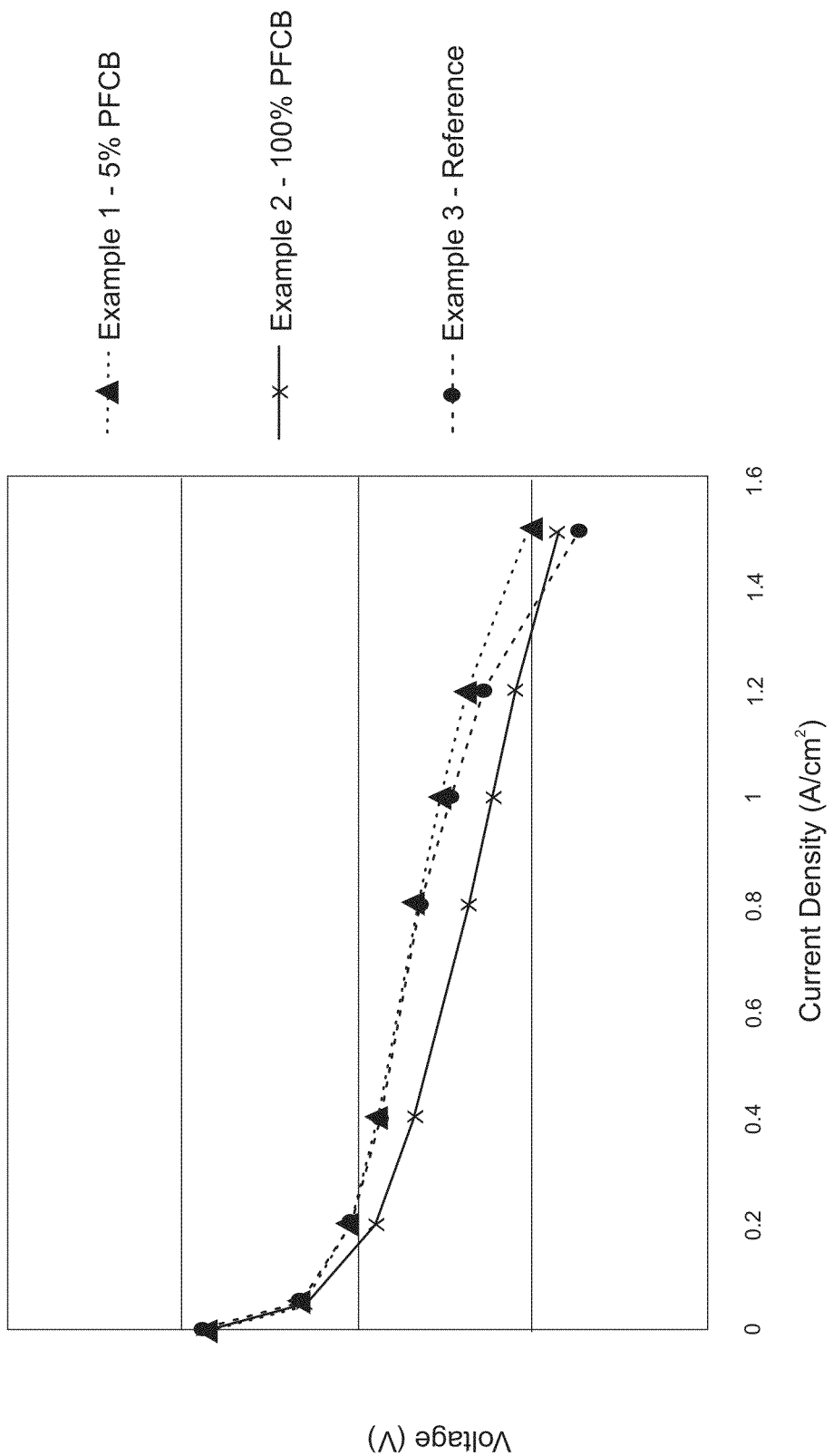
FIG. 14 is a polarization curve at 80° C., 100% relative humidity (RH), and 170 $kPa_{abs}$ for a fuel cell incorporating various cathode layers formed from the inks of embodiments of the invention.
Figure 15:
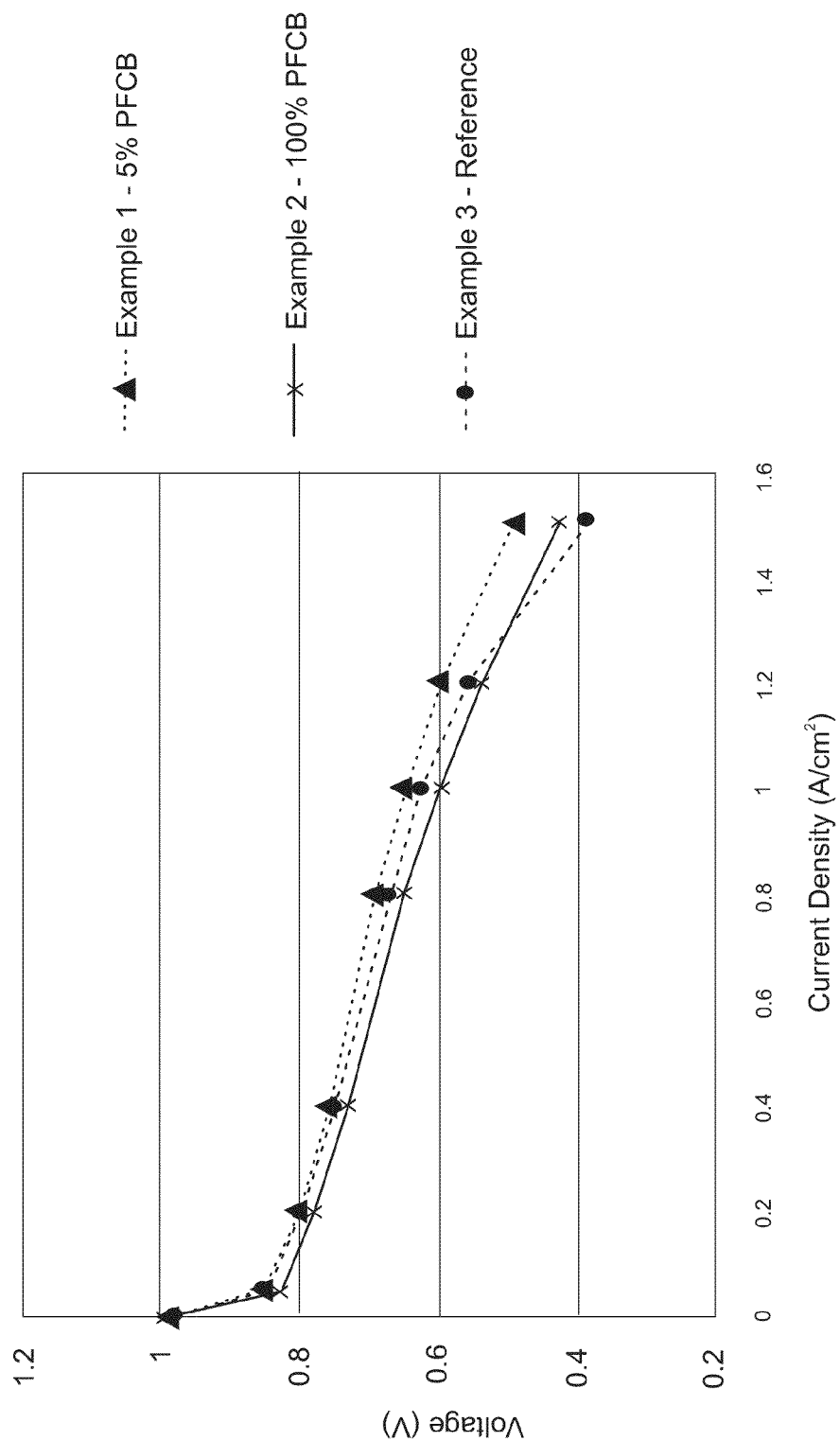
FIG. 15 is a polarization curve at 95° C., 26% relative humidity (RH), and 150 $kPa_{abs}$ for a fuel cell incorporating various cathode layers formed from the inks of embodiments of the invention.

FIGS. 14-15 provide polarization curves comparing the performance for fuel cells having cathode layers made from inventive samples 6-7 and comparative example 2. FIG. 14 is a polarization curve at 80° C., 100% relative humidity (RH), and 170 kPa$_{abs}$. FIG. 15 is a polarization curve at 95° C., 26% relative humidity (RH), and 150 kPa$_{abs}$. In general, the performance of each of the PFCB samples is roughly equivalent to the PFSA reference (comparative example 2).

In summary, the compositions of ionomers from least to most severe with respect to mitigating mud cracks in the electrodes are as follows: 5:95 (700 e.w. PFCB:900 e.w. PFSA, FIG. 8)≈0:100 (700 e.w. PFCB, FIG. 9)≈100:0 (700 e.w. PFSA, FIG. 2)>50:50 (700 e.w. PFSA: 900 e.w. PFSA, FIG. 6)≈75:25 (700 e.w. PFSA: 900 e.w. PFSA, FIG. 7)>25:75 (700 e.w. PFSA: 900 e.w. PFSA, FIG. 5)>0:100 (700 e.w. PFSA: 900 e.w. PFSA, FIG. 3)≈0:100 (700 e.w. PFSA: 900 e.w. PFSA, FIG. 10)>10:90 (700 e.w. PFSA: 900 e.w. PFSA, FIG. 4)

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An ink composition for forming a fuel cell electrode, the ink composition comprising:
   a first protogenic group-containing ionomer having an equivalent weight less than 800;
   an optional second protogenic group-containing ionomer having an equivalent weight greater than 800; and
   a catalyst composition.

2. The ink composition of claim 1 wherein the first protogenic group-containing ionomer and the second protogenic group-containing ionomer each independently include a component selected from the group consisting of —SO$_2$X, —PO$_3$H$_2$, and —COX; and X is an —OH, a halogen, an ester, or

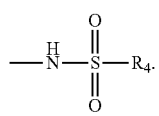

3. The ink composition of claim 1 wherein the first protogenic group-containing ionomer and the second protogenic group-containing ionomer each independently include a sulfonic acid group (—SO$_3$H).

4. The ink composition of claim 1 wherein the first protogenic group-containing ionomer has an equivalent weight less than 750 and the second protogenic group-containing ionomer has an equivalent weight greater than 850.

5. The ink composition of claim 1 wherein the first protogenic group-containing ionomer is present in an amount from about 5% to about 95% of the combined weight of the first protogenic group-containing ionomer and the second protogenic group-containing ionomer, and the second protogenic group-containing ionomer is present in an amount from about 5% to about 95% of the combined weight of the first protogenic group-containing ionomer and the second protogenic group-containing ionomer.

6. The ink composition of claim 1 wherein the first protogenic group-containing ionomer is present in an amount from about 10% to about 75% of the combined weight of the first protogenic group-containing ionomer and the second protogenic group-containing ionomer, and the second protogenic group-containing ionomer is present in an amount from about 25% to about 90% of the combined weight of the first protogenic group-containing ionomer and the second protogenic group-containing ionomer.

7. The ink composition of claim 1 wherein the first protogenic group-containing ionomer and the second protogenic group-containing ionomer are each independently a perfluorosulfonic acid (PFSA) polymer.

8. The ink composition of claim 1 wherein the first protogenic group-containing ionomer and the second protogenic group-containing ionomer each independently include a polymer having perfluorocyclobutyl moieties, wherein the perfluorocyclobutyl moieties are:

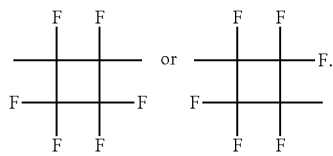

9. The ink composition of claim 8 wherein the first protogenic group-containing ionomer and the second protogenic group-containing ionomer each independently include a polymer segment comprising polymer segment 1:

$$E_0\text{-}P_1\text{-}Q_1\text{-}P_2 \qquad 1$$

wherein:
   $E_0$ is a moiety that has a protogenic group;
   $P_1$, $P_2$ are each independently absent, —O—, —S—, —SO—, —CO—, —SO$_2$—, —NH—, NR$_2$—, or —R$_3$—;
   $R_2$ is $C_{1-25}$ alkyl, $C_{1-25}$ aryl or $C_{1-25}$ arylene;
   $R_3$ is $C_{1-25}$ alkylene, $C_{1-25}$ perfluoroalkylene, perfluoroalkyl ether, alkylether, or $C_{1-25}$ arylene;
   X is an —OH, a halogen, an ester, or

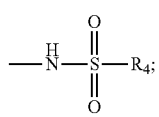

R₄ is trifluoromethyl, $C_{1-25}$ alkyl, $C_{1-25}$ perfluoroalkylene, $C_{1-25}$ aryl, or $E_1$ (see below); and $Q_1$ is a fluorinated cyclobutyl moiety.

10. The ink composition of claim 8 wherein the first protogenic group-containing ionomer and the second protogenic group-containing ionomer each independently include polymer segments 2 and 3:

$$[E_1(Z_1)_d]\text{—}P_1\text{-}Q_1\text{-}P_2 \qquad 2$$

$$E_2\text{-}P_3\text{-}Q_2\text{-}P_4 \qquad 3$$

wherein:

$Z_1$ is absent or a protogenic group such as —SO₂X, —PO₃H₂, —COX, and the like;

$E_1$ is an aromatic containing moiety;

$E_2$ is an unsulfonated aromatic-containing and/or aliphatic-containing moiety;

X is an —OH, a halogen, an ester, or

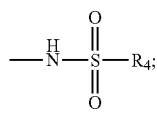

d is the number of $Z_1$ attached to $E_1$;

$P_1$, $P_2$, $P_3$, $P_4$ are each independently absent, —O—, —S—, —SO—, —CO—, —SO₂—, —NH—, NR₂—, or —R₃—;

$R_2$ is $C_{1-25}$ alkyl, $C_{1-25}$ aryl, or $C_{1-25}$ arylene;

$R_3$ is $C_{1-25}$ alkylene, $C_{1-25}$ perfluoroalkylene, perfluoroalkyl ether, alkylether, or $C_{1-25}$ arylene;

$R_4$ is trifluoromethyl, $C_{1-25}$ alkyl, $C_{1-25}$ perfluoroalkylene, $C_{1-25}$ aryl, or another $E_1$ group; and $Q_1$, $Q_2$ are each independently a fluorinated cyclobutyl moiety.

11. The ink composition of claim 8 wherein the first protogenic group-containing ionomer and the second protogenic group-containing ionomer each independently include polymer segments 4 and 5:

$$\begin{array}{c} E_1\text{—}P_1\text{—}Q_1\text{—}P_2 \\ | \\ R_8(Z_1)_d \end{array} \qquad 4$$

$$E_2\text{—}P_3\text{—}Q_2\text{—}P_4 \qquad 5$$

wherein:

$Z_1$ is absent or a protogenic group such as —SO₂X, —PO₃H₂, —COX, and the like;

$E_1$, $E_2$ are each independently an aromatic-containing and/or aliphatic-containing moiety;

X is an —OH, a halogen, an ester, or

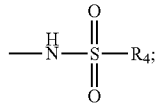

d is the number of $Z_1$ attached to $R_8$;

$P_1$, $P_2$, $P_3$, $P_4$ are each independently absent, —O—, —S—, —SO—, —CO—, —SO₂—, —NH—, NR₂—, or —R₃—;

$R_2$ is $C_{1-25}$ alkyl, $C_{1-25}$ aryl, or $C_{1-25}$ arylene;

$R_3$ is $C_{1-25}$ alkylene, $C_{1-25}$ perfluoroalkylene, perfluoroalkyl ether, alkylether, or $C_{1-25}$ arylene;

$R_4$ is trifluoromethyl, $C_{1-25}$ alkyl, $C_{1-25}$ perfluoroalkylene, $C_{1-25}$ aryl, or another $E_1$ group;

$R_8(Z_1)_d$ is a moiety having d number of protogenic groups;

$R_8$ is $C_{1-25}$ alkylene, $C_{1-25}$ perfluoroalkylene, perfluoroalkyl ether, alkylether, or $C_{1-25}$ arylene; and $Q_1$, $Q_2$ are each independently a fluorinated cyclobutyl moiety.

12. The ink composition of claim 8 wherein the first protogenic group-containing ionomer and the second protogenic group-containing ionomer each independently include polymer segments 6 and 7:

$$E_1(SO_2X)_d\text{—}P_1\text{-}Q_1\text{-}P_2 \qquad 6$$

$$E_2\text{-}P_3\text{-}Q_2\text{-}P_4 \qquad 7.$$

13. The ink composition of claim 1 wherein the catalyst composition includes a precious metal and an optional catalyst support.

14. The ink composition of claim 1 further comprising solvent.

15. The ink composition of claim 10 wherein:

$R_2$ is $C_{1-25}$ alkyl;

$R_3$ is $C_{1-25}$ alkylene or $C_{1-25}$ perfluoroalkylene;

$R_4$ is trifluoromethyl or $C_{1-25}$ alkyl; and $R_8$ is $C_{1-25}$ alkylene or $C_{1-25}$ perfluoroalkylene.

16. The ink composition of claim 15 wherein d is 1 to 4.

17. The ink composition of claim 11 wherein:

$R_2$ is $C_{1-25}$ alkyl;

$R_3$ is $C_{1-25}$ alkylene or $C_{1-25}$ perfluoroalkylene;

$R_4$ is trifluoromethyl or $C_{1-25}$ alkyl; and $R_8$ is $C_{1-25}$ alkylene or $C_{1-25}$ perfluoroalkylene.

18. The ink composition of claim 17 wherein d is 1 to 4.

* * * * *